United States Patent
Nath et al.

(10) Patent No.: US 8,942,680 B2
(45) Date of Patent: Jan. 27, 2015

(54) SYSTEM AND METHOD FOR RETRIEVING THE DYNAMIC STATE OF A MOBILE COMMUNICATION DEVICE

(75) Inventors: Badri Nath, Edison, NJ (US); Rakesh Kushwaha, Marlboro, NJ (US)

(73) Assignee: Mformation Software Technologies LLC, Woodbridge, NJ (US)

( * ) Notice: Subject to any disclaimer, the term of this patent is extended or adjusted under 35 U.S.C. 154(b) by 132 days.

(21) Appl. No.: 12/358,855

(22) Filed: Jan. 23, 2009

(65) Prior Publication Data

US 2010/0190481 A1 Jul. 29, 2010

(51) Int. Cl.
*H04L 29/08* (2006.01)
*H04W 4/00* (2009.01)
*H04W 4/20* (2009.01)
*H04W 4/18* (2009.01)

(52) U.S. Cl.
CPC .............. *H04W 4/20* (2013.01); *H04W 4/206* (2013.01); *H04L 67/2823* (2013.01); *H04L 67/303* (2013.01); *H04L 67/2895* (2013.01); *H04W 4/18* (2013.01)
USPC .................................... 455/414.4; 455/432.2

(58) Field of Classification Search
USPC ...................................... 455/414.1
See application file for complete search history.

(56) References Cited

U.S. PATENT DOCUMENTS

2006/0274869 A1* 12/2006 Morse ........................... 375/352
2008/0207182 A1* 8/2008 Maharajh et al. .......... 455/414.1
2008/0305778 A1* 12/2008 Aaltonen et al. ........... 455/414.1
2009/0011744 A1 1/2009 Daley et al.

FOREIGN PATENT DOCUMENTS

| JP | 2002-049551 A | 2/2002 |
| JP | 2007-201742 A | 8/2007 |
| JP | 2007-235565 A | 9/2007 |
| JP | 2008-191702 A | 8/2008 |
| JP | 2008-282295 A | 11/2008 |

OTHER PUBLICATIONS

International Search Report for International application PCT/US09/31812.
Wag UAProf, Wireless Application Protocol Forum, XP002677058, Oct. 20, 2001, pp. 1-86.

(Continued)

*Primary Examiner* — Vladimir Magloire
*Assistant Examiner* — Natasha Cosme
(74) *Attorney, Agent, or Firm* — Brosemer, Kolefas & Assoc. LLC (57) ABSTRACT

A system and method for retrieving the dynamic state of mobile communication devices is disclosed. The key state indicators from mobile communication devices are retrieved to target user requested contents or advertising contents for users of the communication devices. The method for delivering the contents to mobile communication devices includes determining key state indicators (KSI) of mobile communication devices sending the determined values to a server, and orienting the values to send the content to users of said mobile communication devices, on request. The key state indicators of mobile communication devices comprises of device state, link state, network state, behavior state and dynamic state of the device. The values of key state indicators are calculated and stored in said mobile communication device in a Mobile Advertising Record (MAR) format.

16 Claims, 9 Drawing Sheets

(56) References Cited

OTHER PUBLICATIONS

EPO, Extended European Search Report, App. No. 09838998.4-1244/2389756, Jun. 26, 2012, pp. 1-5.

EPO, Communication Pursuant to Article 94(3) EPC, App. No. 09838998.4, Jul. 10, 2013, pp. 1-4.

JPO, Office Action, Japanese Patent App. No. 2011-547892, Sep. 30, 2013, pp. 1-3, with English language summary.

* cited by examiner

| MAR | Device ID |
|---|---|
| KSI: Number | |
| Device State | Name: Value |
| Link State | Name: Value |
| Network State | Name: Value |
| Location State | Name: Value |
| Dynamic State | Name: Value |

SYSTEM AND METHOD FOR RETRIEVING THE DYNAMIC STATE OF A MOBILE COMMUNICATION DEVICE

BACKGROUND

1. Technical Field

The embodiments herein relate to wireless communication devices and more particularly to a system for obtaining the dynamic state of a wireless communication device.

2. Description of the Related Art

Mobile communication devices have a wide range of bandwidth, which provides a means to download the internet content. The content available on the internet can be viewed on the mobile communication devices, but the form factor required and the capabilities of the device vary significantly. The content is required to be reformatted to fit the display and the resolution of the device. Applications and contents have to be tested and have to be specially formatted to work on the platforms supported by the device. Existing techniques use device catalogues such as user agent profiles to determine device capability.

Current techniques such as user profiles rely only on static profiles for the mobile communication device. The user profiles do not account for any modifications that may have been done to the device in terms of attachable or removable extensions as well as changes to the available resources on the wireless device. User profiles are static and do not capture dynamic capabilities of the device. Further user profiles are not available for all devices and even if available, the data could be obsolete or wrong. There is no standard format for representation and parsing the various fields in these profiles. Static profiles do not capture the current state of the mobile communication device.

SUMMARY

In view of the foregoing, an embodiment herein provides a method for delivering contents to mobile communication devices. The method comprising steps of determining key state indicators (KSI) of the mobile communication devices, sending the values to a server, and orienting the values to send the content to users of the mobile communication devices, on request. The content can be at least one of user requested content and advertising impressions targeted to user of the mobile communication device. The values are stored in a Mobile Advertising Record (MAR) format. Key state indicators of the mobile communication devices are the device state, link state, network state, behavior state, and the dynamic state of the device. The device state of the KSI includes one of construction of the mobile communication device, model of the device, resource availability, software versions, and firmware versions of the mobile communication device. The link state of the KSI includes signal strength, and network coverage received at the device. Network state of the KSI includes one of network location determining user habitat, and roaming status of the mobile communication device. Location state of the KSI includes physical location of the device provided by network location identifiers. The behavior state of the KSI includes details of the application usage on the mobile communication device. The dynamic device state includes current display size, display capability, or audio and touch capability of external interfaces connected to the mobile communication device. The key state indicator values obtained are sent to the central server on an on-demand basis, periodic basis, and on an event occurring on the device. The resource availability may be memory, disk space, and battery power. Location state of the device is collected at time intervals to compute direction and paths taken by the mobile communication devices. Mobile communication device sends request to include identity of the server storing MAR for the mobile communication device. MAR stored on the device is retrieved and embedded in a browser request sent to a content server. MAR follows a standard format for storing the values of the key state indicators.

The embodiments further disclose a system for delivering contents to mobile communication devices. The system is adapted to determine key state indicators (KSI) of the mobile communication devices, store values of the key state indicators in the mobile communication devices, send the values to a server, and orient the values to send the content to users of the mobile communication devices, on request. The content can be at least one of user requested content and advertising impressions targeted to user of the mobile communication device. The values are stored in the mobile communication device in a Mobile Advertising Record (MAR) format. The server can be at least one of a device management server, and content server. The mobile communication device includes a device management client adapted to receive identity of the device management server for the mobile communication device, and store address of the device management server in preferred location in the mobile communication device. The identity of device management server is programmed in the mobile communication device using the device management client. The content servers retrieve MAR from the device management server for formatting content to suit the mobile communication devices. The mobile communication device supports at least one of General Packet Radio System (GPRS), Universal Mobile telecommunication system (UMTS), Code Division Multiple Access (CDMA), Long Term Evolution (LTE), Worldwide Interoperability for Microwave Access (WiMAX), or Wireless Local Area Network (LAN). Address of the device management server is in Uniform Resource Location (URL) format and the server can be accessed on-line for retrieving MAR stored for the mobile communication devices.

These and other aspects of the embodiments herein will be better appreciated and understood when considered in conjunction with the following description and the accompanying drawings.

BRIEF DESCRIPTION OF THE DRAWINGS

The embodiments herein will be better understood from the following detailed description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve a system and method for retrieving the dynamic state of a mobile communication device for the purpose of delivering advertising and other content to the mobile communication device. Referring now to the drawings, and more particularly to FIGS. 1 through 9, where similar reference characters denote corresponding features consistently throughout the figures, there are shown embodiments.

The dynamic state of the mobile communication device can be obtained for the purpose of formatting the content sent to the mobile communication device. The formatted content can include the user requested content as well as any advertising content sent to the user of the mobile communication device. The component values of mobile communication device represent both the static state of the device and the dynamic state of the device. The data representations of the state of the mobile communication device can be stored in the mobile communication device or an external server. The complete state of the mobile communication device is represented in a format which can be analyzed by a programmed entity. The formatted values represent the Mobile Advertising Record (MAR).

Figure 1:
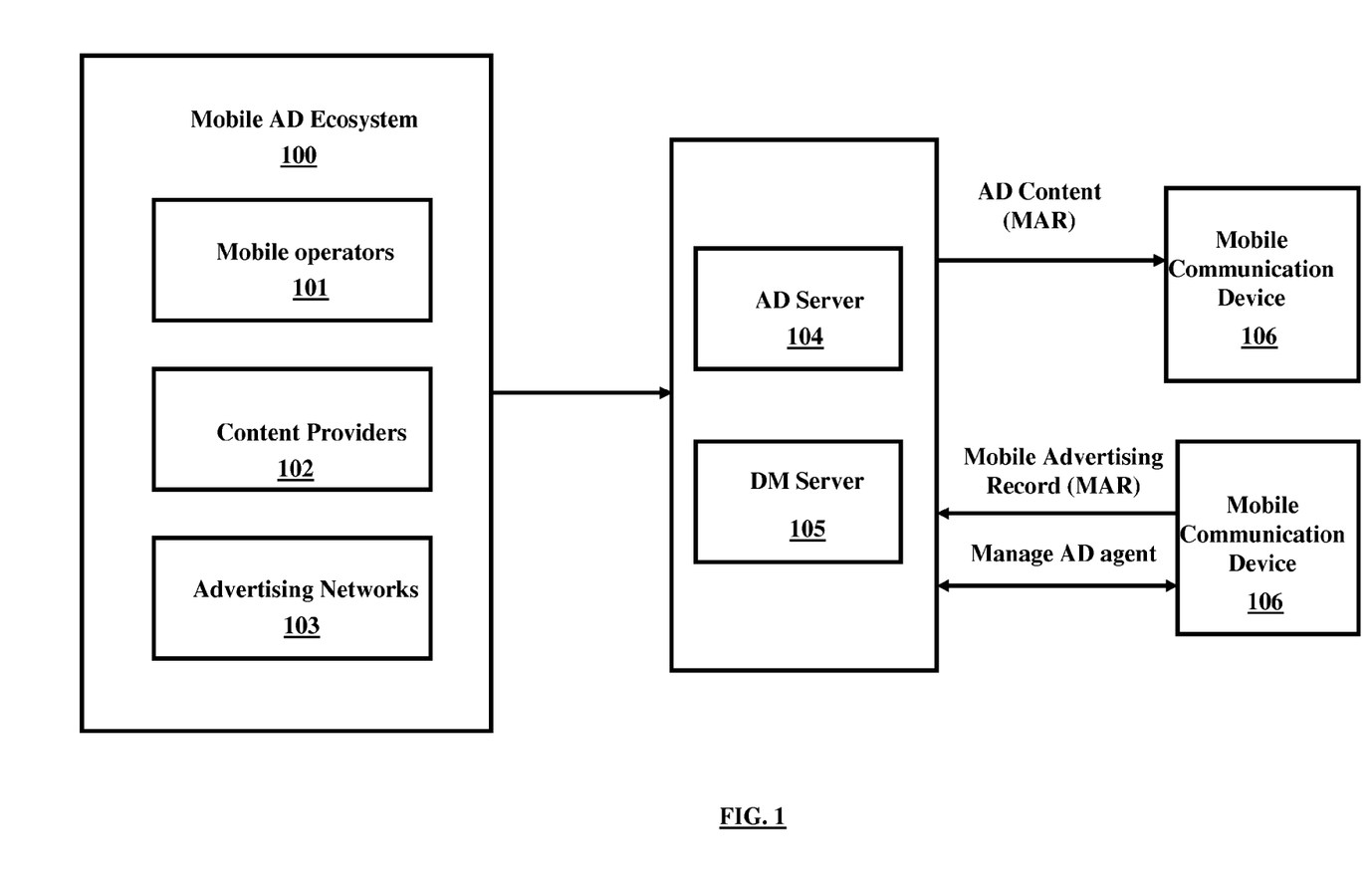
FIG. 1 illustrates the block diagram of a system for retrieving the dynamic state of the mobile communication device, in accordance with the embodiments herein.

FIG. 1 illustrates the block diagram of a system for retrieving the dynamic state of the mobile communication device, in accordance with the embodiments herein. An agent termed the mobile ad agent is provided on the mobile device 106. The state of the device is stored either in a server on the network or in the mobile device 106 in a standard format called Mobile Advertising Record (MAR). The mobile ad ecosystem 100 comprises mobile operators 101, content providers 102 and advertising networks 103. Mobile operators 101 are the various service providers which enable seamless connectivity reach for the data and also facilitate roaming. The content provides 103 provide an access to different types of content including information related to multimedia and entertainment such as music, wallpapers, and advertisements and so on. Advertising networks 103 connect the web sites that want to host advertisements. Generally ad networks 103 deliver their content through a central server. Ad server 104 handles the various contents such as advertisements and other multimedia content. The device management server 105 is responsible for downloading, configuring and managing the mobile ad agent on the mobile wireless device 106. The mobile ad agent on the mobile device 106 collects the data corresponding to the MAR by measuring the appropriate values on the device. The various attributes can be statically stored values such as device state or dynamically computed values such as inventory application usage, battery memory and so on. These dynamic values in the MAR can be computed on a scheduled basis or when some specific conditions in the device are triggered. The mobile advertising record stored on the device can be sent to a designated server 104 by the mobile ad agent or retrieved by the device management server from the mobile ad agent. Any application that is executed on the mobile communication device 106 can embed the MAR as part of the request sent to a content server 104. Further the content server 104 subsequently modifies the content based on the values of the MAR to deliver contextual content and advertisements to the mobile device 106.

Figure 2:
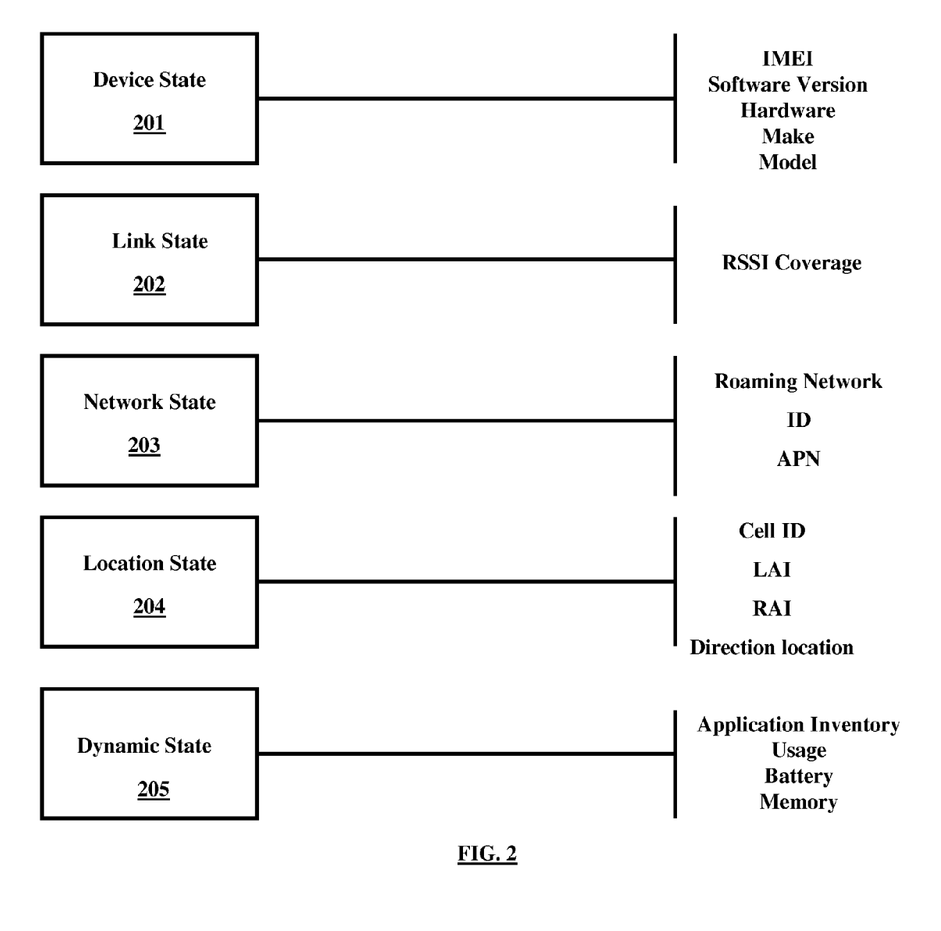
FIG. 2 illustrates the categories of device states collected by the mobile ad agent on the device, in accordance with the embodiments herein.

FIG. 2 illustrates the categories of device states collected by the mobile ad agent on the device, in accordance with the embodiments herein. The Key state indicators (KSI) are part of the mobile advertising record (MAR) on the mobile device 106. These key state indicators are determined on the device and stored in a standard format that comprises of the Mobile Advertising Record. The Key state indicators comprise of both static state and dynamic state of the mobile device 106. The static state of the mobile device 106 characterizes the state of the device that remains constant over a period of time. Values of device state 201 such as make, model, software version etc constitute static values. On the other hand the dynamic state values of the mobile communication device 106 such as location state 204, network state 203 and the like vary over a period of time and need to be computed either continuously or on a demand basis. The device management server 105 configures the mobile ad agent to collect data of all or of any key state indicator.

Figure 3:
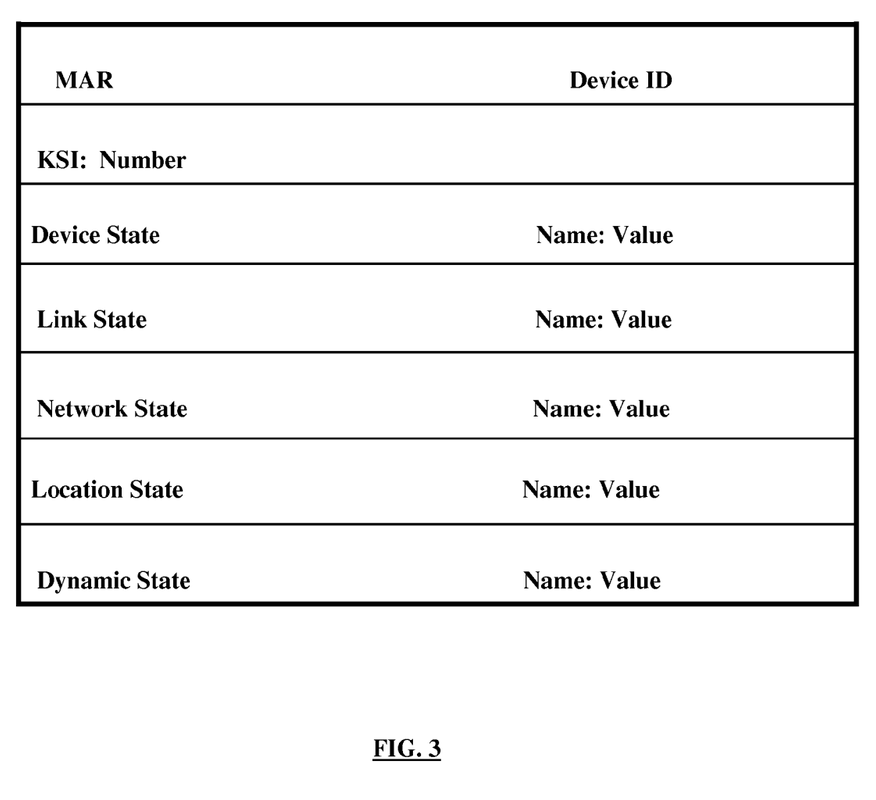
FIG. 3 illustrates the format and structure of the mobile communication device, in accordance with the embodiments herein.

FIG. 3 illustrates the format and structure of the MAR, in accordance with the embodiments herein. The MAR is a variable length record that is stored on the mobile communication device 106 or on a server. The MAR is provided with a device identifier such as International Mobile Equipment Identity (IMEI) number and the like which is used to uniquely identify the mobile device 106. The next field identifies the number of key state indicators and the size of each key category of the key state indicator. The standard format of the MAR allows for efficient processing of the MAR when it is retrieved by the device management server 105. The MAR values stored are both the static values and the dynamic values of the mobile communication device 106. Values of device state 201 such as make, model, software version etc constitute static values. On the other hand the dynamic state values of the mobile communication device 106 such as location state 204, network state 203 and the like vary over a period of time and need to be computed either continuously or on a demand basis. The MAR is either retrieved by the device management server 105 or is sent as part of the request from the mobile communication device 106. The values of key state indicators stored in the MAR are used to effectively target the content and advertising to be sent to the mobile communication device 106.

Figure 4:
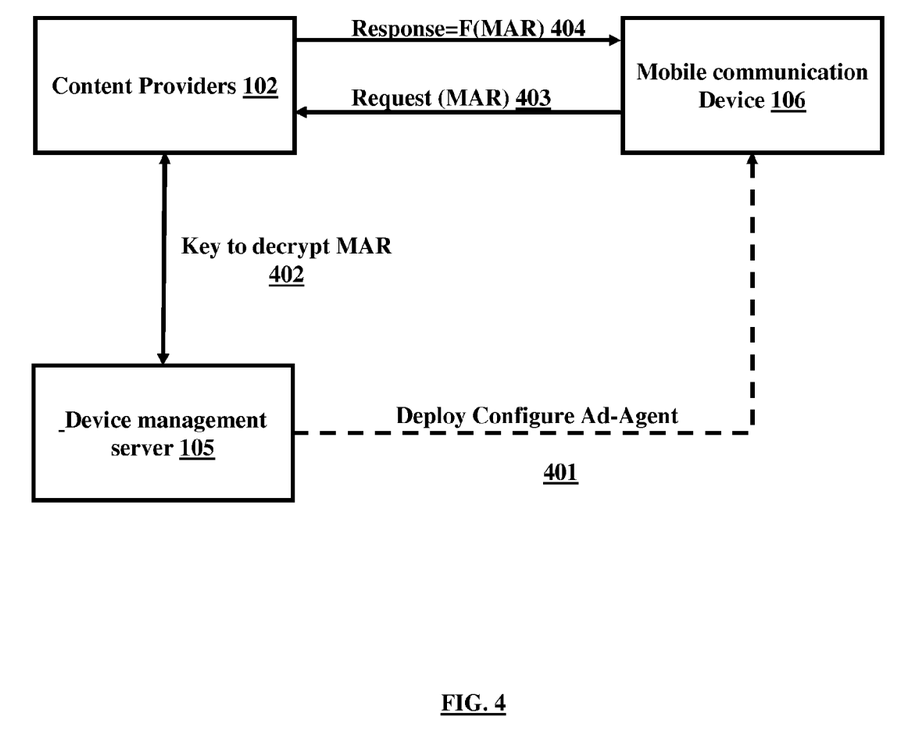
FIG. 4 illustrates the block diagram of a system in which the mobile advertising record is sent as part of the request, in accordance with the embodiments herein.

FIG. 4 illustrates the block diagram of a system in which the mobile advertising record is sent as part of the request by the mobile communication device, in accordance with the embodiments herein. This architecture is for situations in which the entire MAR can be embedded in the request from the mobile device 106. In an embodiment the MAR computed by the mobile ad agent 100 is embedded as part of any request sent by the device to any content server 104. The content server 104 acts on the embedded MAR and modifies the content to reflect the state of the mobile communication device 106. The content server 104 then delivers the content as a part of the response. The response can include any advertisement that is part of the content. MAR may be encrypted using any suitable cryptographic algorithm. The device management server 105 configures (401) the mobile ad agent 100 with the key required for encryption. Further the device management server 105 can revoke or change the key as needed. The device management server 105 also sends (402) the key to the content server 104 to help the content server decrypt the MAR. The mobile communication device 106 sends a request (403) to the content server 102, where the request also comprises of the MAR. The content server 104 addresses the request and delivers 404 the tailored content to the mobile communication device 106.

Figure 5:
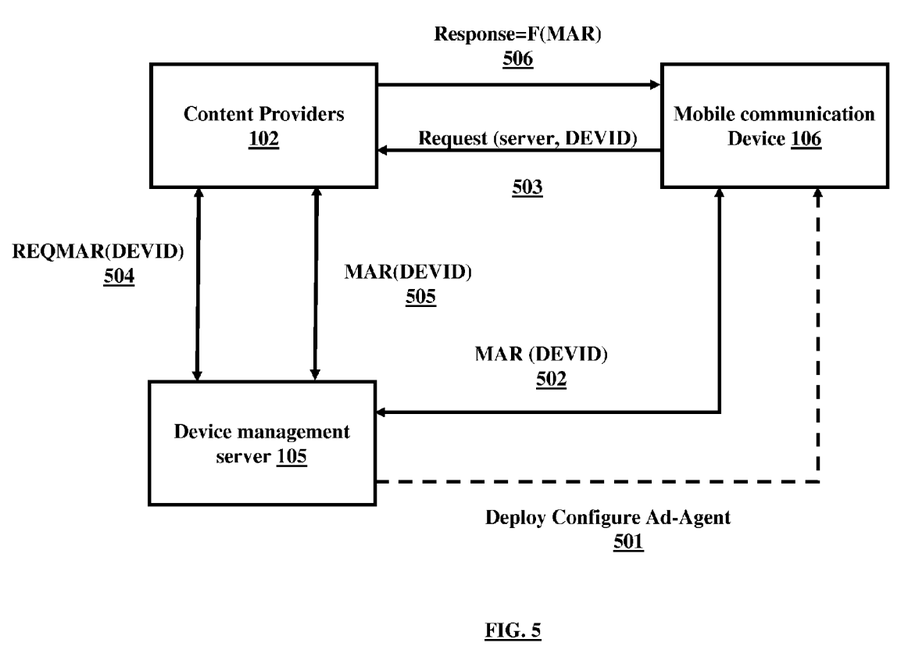
FIG. 5 illustrates a block diagram of a system in which the mobile advertisement record is retrieved from a device management server, in accordance with the embodiments herein.

FIG. 5 illustrates a block diagram of a system in which the mobile advertisement record is retrieved from a device management server, in accordance with the embodiments herein. The device management server 105 configures (501) the mobile ad agent and also collects the MAR from the mobile communication device. MAR is sent to the server either on a on-demand basis, or periodically or when a specific event occurs. MAR's for various mobile devices are collected and stored in the device management server 105. The MAR for each mobile communication device 106 is indexed by a unique device identifier. A request (502) from the mobile communication device 106 contains only the device identifier and the name of the device management server that stores the MAR of the device. The request (503) along with the unique device identifier is sent to the content server 104. The device management server 105 sends (504) the key required for decryption to the content server 104 in response to the request. The content server 104 sends (505) the MAR to the device management server 105 for the given device identifier. Further the tailored content is sent (506) to the mobile communication device 106 as a response to the request from the mobile communication device 106.

Figure 6:
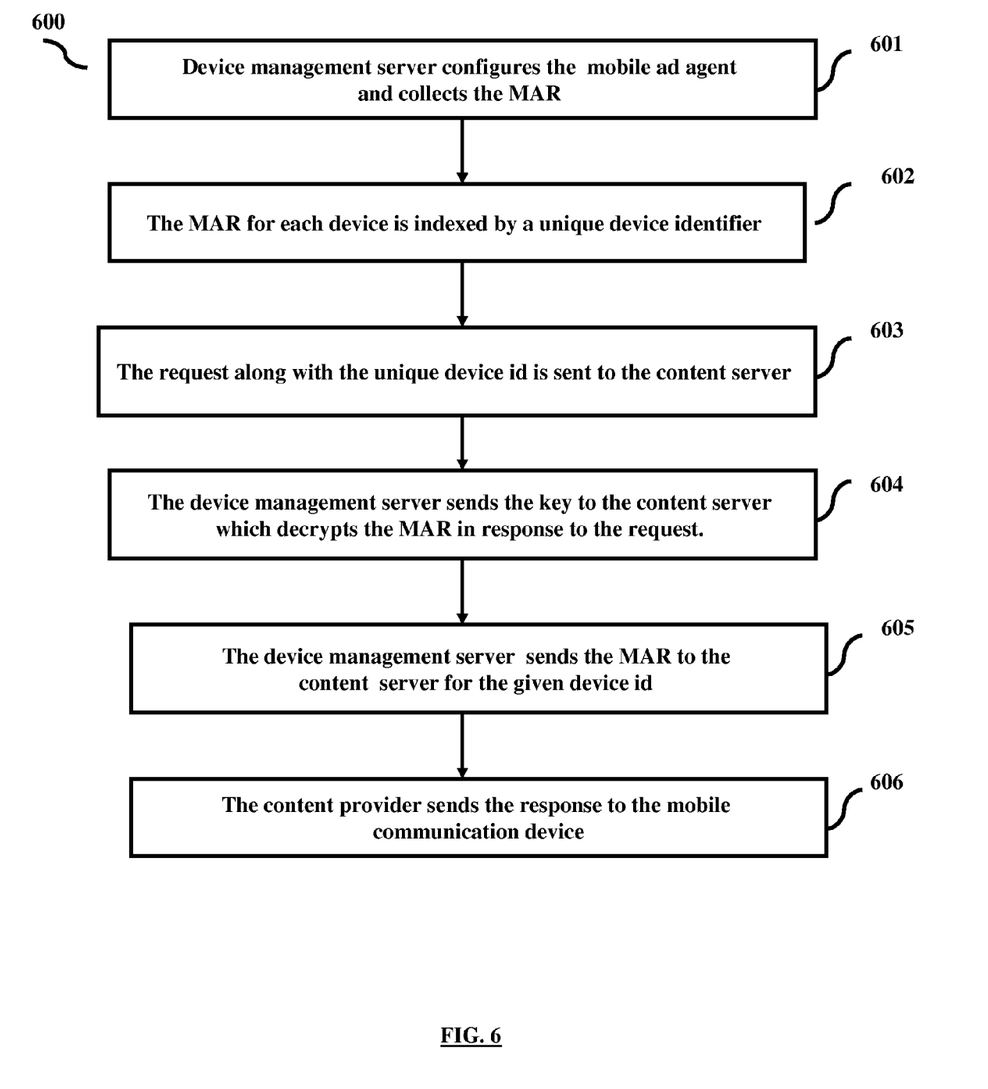
FIG. 6 illustrates a flow chart depicting a method to retrieve mobile advertisement record from a device management server, in accordance with the embodiments herein.

FIG. 6 illustrates a flow chart depicting a method to retrieve mobile advertisement record from a device management server, in accordance with the embodiments herein. The device management server 105 configures (601) the mobile ad agent and also collects the MAR. MAR is sent to the server by the mobile ad agent either on an on-demand basis, or periodically or when a specific event occurs. MAR's for various mobile communication devices 106 are collected and stored in the device management server 105. The MAR for each mobile communication device 106 is indexed (602) by a unique device identifier. Any request from the mobile communication device 106 contains only the device identifier and or name of the device management server 105 that stores the MAR of the device. The request (603) along with the unique device identifier is sent to the content server 104. The device management server 105 sends (604) the required for decryption to the content server 104 in response to the request. The content server 104 sends (605) the MAR to the device management server (105) for the given device identifier. Further the tailored content is sent (606) to the mobile communication device 106 as a response to the request from the mobile communication device 106. The various actions in method 600 may be performed in the order presented, in a different order or simultaneously. Further, in some embodiments, some actions listed in FIG. 6 may be omitted.

Figure 7:
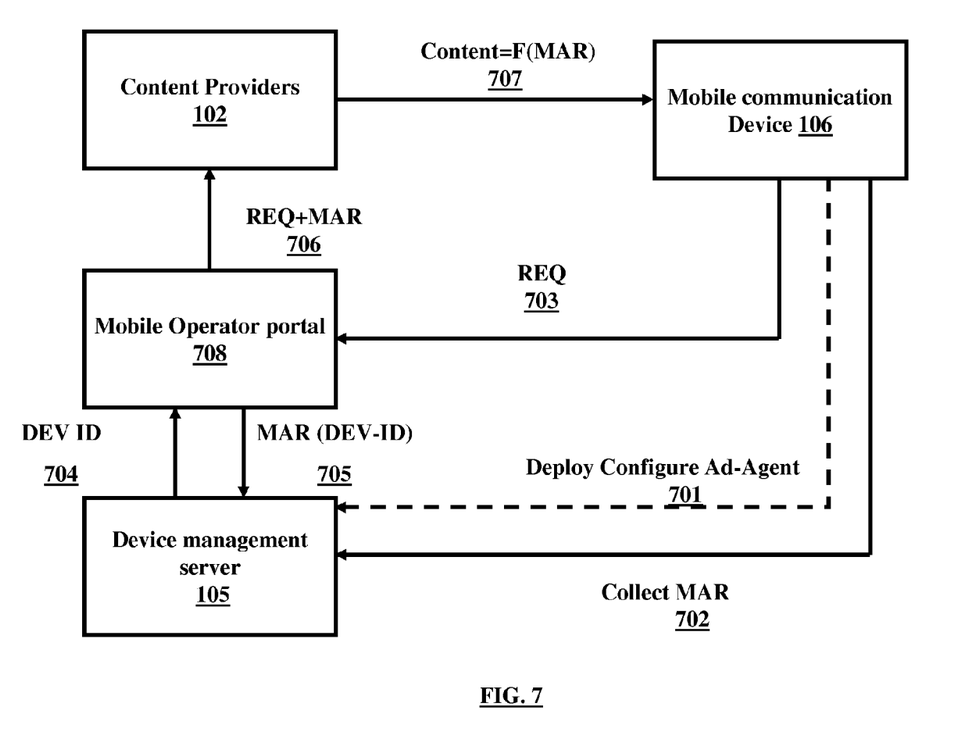
FIG. 7 illustrates the block diagram of the system equipped with a portal in which mobile advertising record (MAR) is used for on deck applications, in accordance with the embodiments herein.

FIG. 7 illustrates the block diagram of the system equipped with a portal in which mobile advertising record (MAR) is used for on deck applications, in accordance with the embodiments herein. Any request from the mobile communication device 106 is sent to a portal 708 maintained by the mobile operator 101. Applications that make request to a well defined portal 708 are provided using the network resources of the mobile operator 101 and often referred to as on-deck applications. The device management server configures (701) the mobile ad agent on the mobile communication device 106. Device management server 105 collects (702) the MAR from the mobile ad agent 105 on the mobile communication device 106. Requests (703) from the on-deck applications are used to identify the device. Once the device is identified (704) by the portal 708, the portal 708 requests (705) the MAR for the device from the device management server 105. The portal 708 further combines (706) the request with the MAR and forwards it to the content server 104. Further the content provider 102 modifies the required content accordingly and sends (707) the response to the mobile communication device 106.

Figure 8:
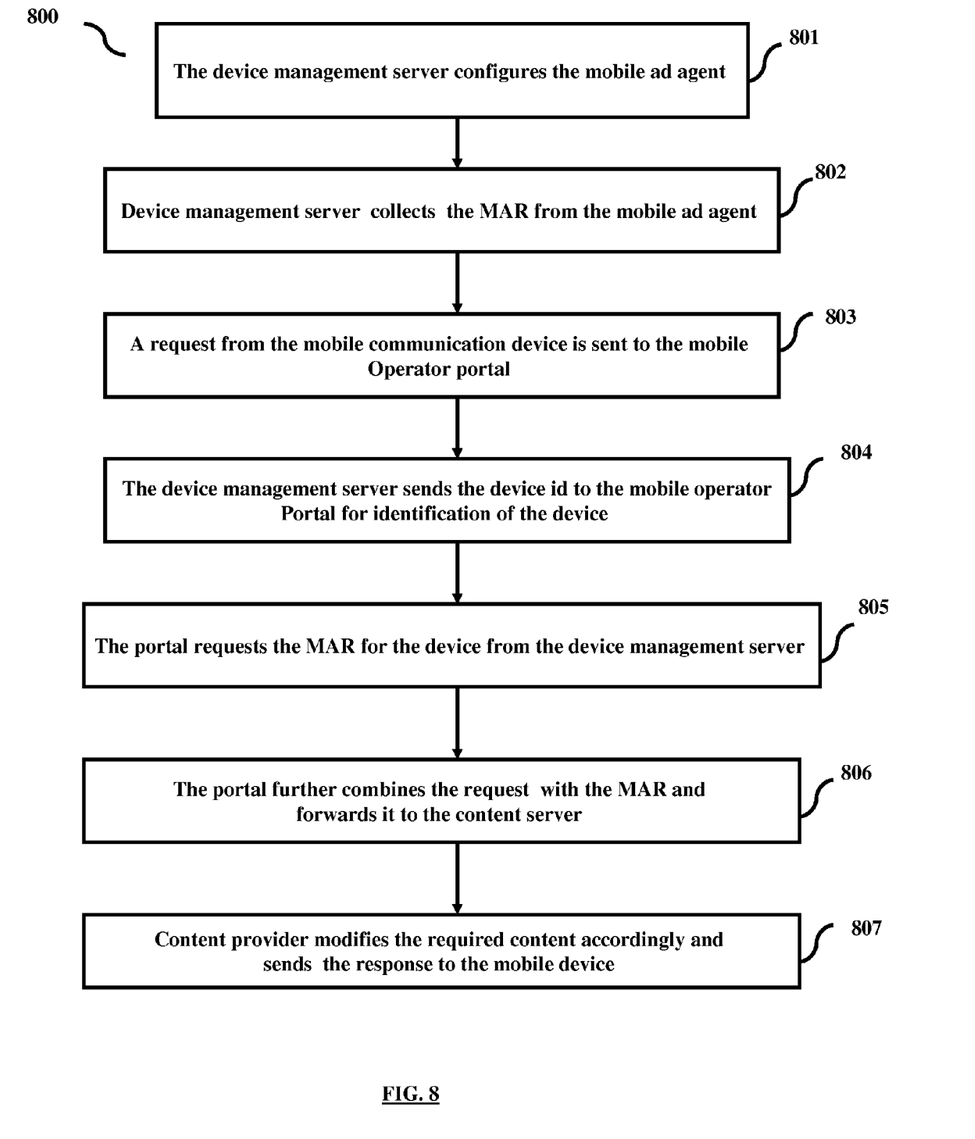
FIG. 8 illustrates a flow chart depicting a method in which mobile advertising record is used for on deck applications, in accordance with the embodiments herein.

FIG. 8 illustrates a flow chart depicting a method in which mobile advertising record is used for on deck applications, in accordance with the embodiments herein. The device management server 105 configures (801) the mobile ad agent on the mobile communication device 106. Device management server 105 collects (802) the MAR from the mobile ad agent on the mobile communication device 106. A mobile operator portal 708 is maintained by the mobile operator 101. When the mobile communication device makes a request (803), the request is addressed by the mobile operator portal 708. Further device management server sends (804) the device identifier to the mobile operator portal 708 for the identification of the mobile communication device 106. The mobile operator portal 708 makes a request (805) to the device management server 105 for the MAR of the mobile communication device 106. The mobile operator portal 708 then combines (806) the request with the MAR and forwards it to the content server 104. The content provider 102 modifies (807) the required content accordingly and sends the response to the mobile communication device 106. The various actions in method 800 may be performed in the order presented, in a different order or simultaneously. Further, in some embodiments, some actions listed in FIG. 8 may be omitted.

Figure 9:
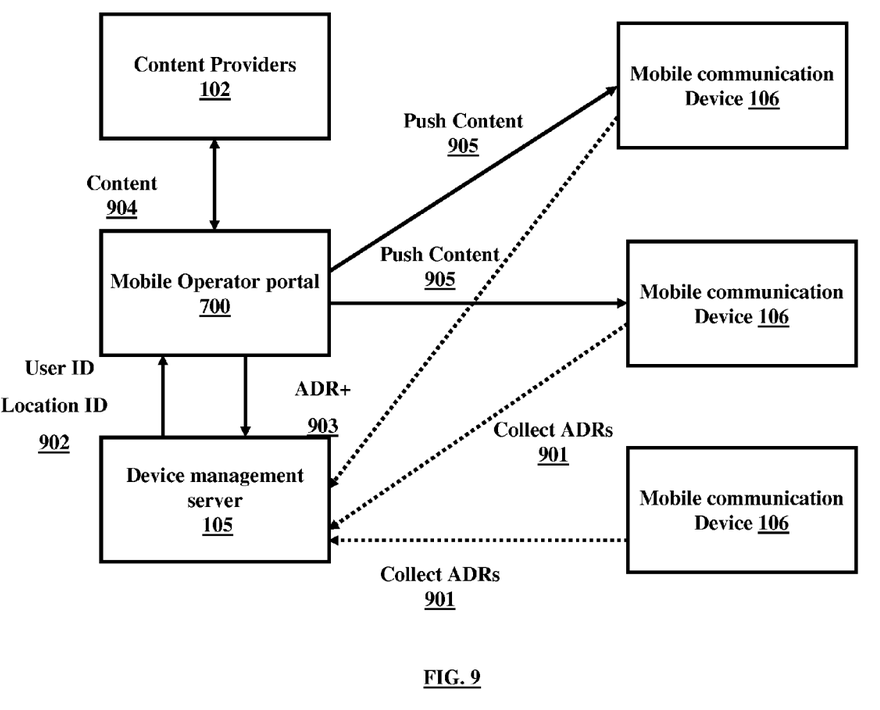
FIG. 9 illustrates the block diagram of a system in which the mobile advertising record is used to modify the content pushed to a group of mobile devices, in accordance with the embodiments herein.

FIG. 9 illustrates the block diagram of a system in which the mobile advertising record is used to modify the content pushed to a group of mobile communication devices, in accordance with the embodiments herein. The MAR for several devices is collected by the device management server 105 and stored where it can be grouped based on some criterion. For example, if a content server 104 wants to send an advertisement to a group of devices in the same location or to devices owned by the same family. The content server 104 provides the content to the portal 708 and specifies the criteria to be used for delivering the content that has been modified based on the MAR obtained for a group of devices. At first, the device management server collects (901) the address of different mobile communication devices 106. The device management server sends (902) the user identifier and location identifier to the mobile operator portal 708 for the identification of the devices. The address is then sent (903) to the device management server 105. The content provider then sends (904) the content to the portal 708 and specifies the criterion to be used to for delivering the content. Further the portal 708 pushes (905) the modified content to the group of mobile communication devices 106. The content is pushed from the portal 708 without a specific request coming from the device. The MARs for various devices are collected by the device management server 105 and then grouped according to the required criteria based on location, make and model, and subscriber relationships.

The embodiments disclosed herein can be implemented through at least one software program running on at least one hardware device and performing network management functions to control the network elements. The network elements shown in FIG. 1 include blocks which can be at least one of a hardware device, a software module or a combination of hardware device and software module.

The embodiment disclosed herein specifies a method of retrieving the key state values of a mobile communication device and storing it in a standard format called mobile advertising record (MAR). Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the invention may be implemented on different hardware devices, e.g. using a plurality of CPUs.

What is claimed is:

1. A method for delivering content to a mobile communication device, said method comprising steps of:
    said mobile communication device obtaining at least one key state indicator (KSI) of said mobile communication device;
    said mobile communication device sending said KSI to a first server;
    said mobile communication device sending a request for content to a second server, said request further comprising a pointer to said KSI in said first server;
    said second server fetching said KSI from said first server;
    said second server adapting said content according to said KSI; and
    said second server sending said adapted content to said mobile communication device,
    wherein said KSI of said mobile communication device relates to at least one of a:
    device state;
    link state;
    network state;
    behavior state; or
    dynamic device state.

2. The method as claimed in claim 1, wherein said content can be at least one of user requested content and advertising impressions targeted to a user of said mobile communication device.

3. The method as claimed in claim 1, wherein said device state comprises at least one of a:
    construction of said mobile communication device;
    model of said mobile communication device;
    resource availability;
    software version; and
    firmware version of said mobile communication device.

4. The method as claimed in claim 3, wherein said resource availability comprises at least one of a:
    memory;
    disk space; and
    battery power.

5. The method as claimed in claim 1, wherein said link state comprises at least one of a:
    signal strength; and
    network coverage,
    received at said mobile communication device.

6. The method as claimed in claim 1, wherein said network state comprises at least one of a:
    network location determining user habitat; and
    roaming status of said mobile communication device.

7. The method as claimed in claim 1, wherein said location state comprises a physical location of said device as provided by network location identifiers.

8. The method as claimed in claim 1, wherein said behavior state comprises information about application usage on said mobile communication device.

9. The method as claimed in claim 1, wherein said dynamic device state comprises at least one of a:
    current display size;
    display capability; or
    audio and touch capability,
of external interfaces connected to said mobile communication device.

10. The method as claimed in claim 1, wherein said KSI is sent to said first server on an on-demand basis.

11. The method as claimed in claim 1, wherein said KSI is sent to said first server on a periodic basis.

12. The method as claimed in claim 1, wherein said KSI is sent to said first server on an event occurring on said mobile communication device.

13. A mobile communication device, said mobile communication device comprising means adapted to:
    obtain at least one key state indicator (KSI) of said mobile communication device;
    store values of said KSI in a first server; and
    send a request for content to a second server, said request comprising a pointer to said KSI in said first server,
    wherein said KSI of said mobile communication device relates to at least one of a:
    device state;
    link state;
    network state;
    behavior state; or
    dynamic device state.

14. The mobile communication device as claimed in claim 13, wherein said mobile communication device includes a device management client adapted to:
    receive an identity of said first server for said mobile communication device; and
    store an address of said first server in a preferred location in said mobile communication device.

15. The mobile communication device as claimed in claim 13, wherein said mobile communication device supports at least one of:
    General Packet Radio System (GPRS);
    Universal Mobile telecommunication system (UMTS);

Code Division Multiple Access (CDMA);
Long Term Evolution (LTE);
Worldwide Interoperability for Microwave Access (WiMAX); or
Wireless Local Area Network (LAN).

16. A server, said server communicating with at least one mobile communication device, said server comprising means adapted to:
- receive a request for content from said mobile communication device, said request comprising a pointer to a location of at least one key state indicator (KSI) of said mobile communication device present in a second server;
- fetch said KSI from said second server;
- adapt said content according to said KSI of said mobile communication device; and
- send said adapted content to said mobile communication device,
- wherein said KSI of said mobile communication device relates to at least one of a:
  - device state;
  - link state;
  - network state;
  - behavior state; or
  - dynamic device state.

* * * * *